United States Patent [19]

Numoto et al.

[11] Patent Number: 5,246,199
[45] Date of Patent: Sep. 21, 1993

[54] SOLENOID VALVE

[75] Inventors: Katsuyuki Numoto; Hisashi Yokoyama, both of Hyogo, Japan

[73] Assignee: Mitsubishi Denki Kabushiki Kaisha, Tokyo, Japan

[21] Appl. No.: 904,593

[22] Filed: Jun. 26, 1992

[30] Foreign Application Priority Data

Aug. 2, 1991 [JP] Japan .................................. 3-194104

[51] Int. Cl.⁵ .............................................. F16K 31/06
[52] U.S. Cl. ................................................. 251/129.15
[58] Field of Search ..................................... 251/129.15

[56] References Cited

U.S. PATENT DOCUMENTS 4,878,650 11/1989 Daly et al. ..................... 251/129.15

FOREIGN PATENT DOCUMENTS 2-31227 7/1990 Japan .

Primary Examiner—Arnold Rosenthal

[57] ABSTRACT

A solenoid valve which includes a division wall disposed between an inlet and outlet ports and around the valve seat for defining a resonant chamber in the space. The division wall is provided with at least one communication hole which communicates between the fluid chamber and the resonant chamber through which hole air passes.

18 Claims, 5 Drawing Sheets

SOLENOID VALVE

BACKGROUND OF THE INVENTION

1. Field of the Invention

The present invention relates generally to a solenoid valve and more particularly to a solenoid valve for opening and closing a fluid passage for gas such as air or vaporized gasoline to thereby control the flow rate and pressure of the flowing gas. This type of solenoid valve is installed on an automobile and useful as a duty control solenoid valve for controlling an amount of the canister purge that is, the amount of vaporized gasoline introduced from the gasoline tank or amount of air flowing in a bypass conduit of a throttle valve to an intake conduit through a canister.

2. Related Art

The conventional solenoid valve is constructed as shown in FIG. 1. The solenoid valve includes a bobbin 1 and an electric wire wound on the bobbin 1 to constitute an electro-magnetic coil 2. Both ends of the coil 2 are connected to a terminal 3. Outer periphery of the electro-magnetic coil 2 is protected by an outer cover 4 formed of mold resin. A connector housing for the terminal portion is formed unitary with the outer cover 4.

A stator core 5 acting as a stationary iron core is disposed in the center of the electro-magnetic coil 2. The stator core 5, a yoke 6 and a plate 7 surrounding the coil 2 constitute a magnetic path. A plunger 8 is slidably supported in a slide guide part 1a of the bobbin 1, one end of which faces the stator core 5. The other end of the plunger 8 is surrounded by a casing 100 which constitutes an inlet port 100a, outlet port 100b, fluid chamber 101 and a valve seat 100c so that a valve member 8a formed by an elastic material and fitted on the other end of the plunger faces the valve seat 100c. A spring 9 is disposed between the plunger 8 and the stator core 5 for urging the valve member 8a toward the valve seat 100c.

An O-ring 10 is fitted between the casing 100 and the plate 7 while an O-ring 11 is fitted between the bobbin 1 and the outer cover 4 to keep the air sealability between the components. Further, a rubber seat 12 is fixed between the yoke 6, stator core 5, bobbin 1 and the outer cover 4 to suppress an undesired vibration and obtain sealability.

The operation of the conventional solenoid valve thus constructed and shown in FIG. 1 will now be described.

When the terminal 3 inputs an electric signal from an outside device not shown, the coil 2 generates a magnetic field to thereby focus the magnetic field around the stator core 5, yoke 6 and plate 7 which constitute the magnetic path, and the plunger 8 acting as the movable iron core is magnetically attracted to the stator core side against the elastic force of the spring 9. The plunger 8 slides in through the slide guide part 1a of the bobbin 1 and, accordingly, the valve member 8a disposed on the end of the plunger 8 moves away from the valve seat 100c unitary formed with the casing 100, and the valve opens. In this condition, the gas starts to flow from the inlet port 100a to the outlet port 100b through the fluid chamber 101 and the valve seat 100c. The positions of the inlet port 100a and the outlet port 100b may be reversely changed to each other from the positions shown in FIG. 1. When the electric signal stops to actuating the coil 2, the plunger 8 is moved to slide by the elastic force of the spring 9 so that the valve member 8a comes into abutment against the valve seat 100c of the casing 100, and the valve closes the fluid path.

Since the conventional solenoid valve is constructed and operated as described above, the valve has a disadvantage that the open/close operation produces an undesirable air current noise in case that the open/close operation repeats in a very short period, for example, several tenth times per second. Of course, such a noise is generated when the open/close operation of the valve is occurred merely one time, however, it may not given rise to the noise problem since the one time operation causes only one sound. On the other hand, under the duty control, the valve opens and closes continuously in a very short period which produces the undesirable noise.

Unexamined Japanese Patent Application (OPI) No. Hei. 2-31227 discloses a silencer for suppressing the undesirable noise generated by the open/close operation of the solenoid valve. However, since recently an engine room of an automobile is required to be compact in size and, accordingly, an extra apparatus such as a silencer or the like should not be mounted on the solenoid valve since it causes the apparatus to undesirably become bigger and increases the component parts which increases a manufacturing cost.

SUMMARY OF THE INVENTION

The present invention was made in accordance with the afore-mentioned drawback accompanying the conventional solenoid valve. Therefore, it is an object of the present invention to provide a solenoid valve capable of suppressing air current noise within the valve itself even under the duty control.

The above and other objects of the invention can be achieve by a provision of a solenoid valve which, according to the present invention, includes a division wall disposed between an inlet and outlet ports and around the valve seat for defining a resonant chamber in the space. The division wall is provided with at least one communication hole which communicates between the fluid chamber and the resonant chamber through which hole air passes.

According to another aspect of the invention, the division wall also performs as a plate constituting a magnetic path and defines a resonant chamber with a bobbin and an outer cover of the coil, in such a manner that the fluid chamber is disposed in a front side of the plate whereas the resonant chamber is disposed in a rear side thereof. The division wall is provided with at least one communication hole through which air communicates between the fluid and resonant chambers.

When the valve opens and closes with very short period by a slide movement of the plunger, an air current noise with high frequency is produced because of shutting the controlled fluid. The sound pressure of the noise generated in the fluid chamber disposed around the valve member enters into the resonant chamber through the communication hole of the division wall and resonances therein. As a result, large air vibration is generated around the communication hole and, accordingly, the energy of the air current in the fluid chamber is suppressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The preferred embodiments of the present invention will now be described in detail with reference to accompanying drawings.

Figure 1:
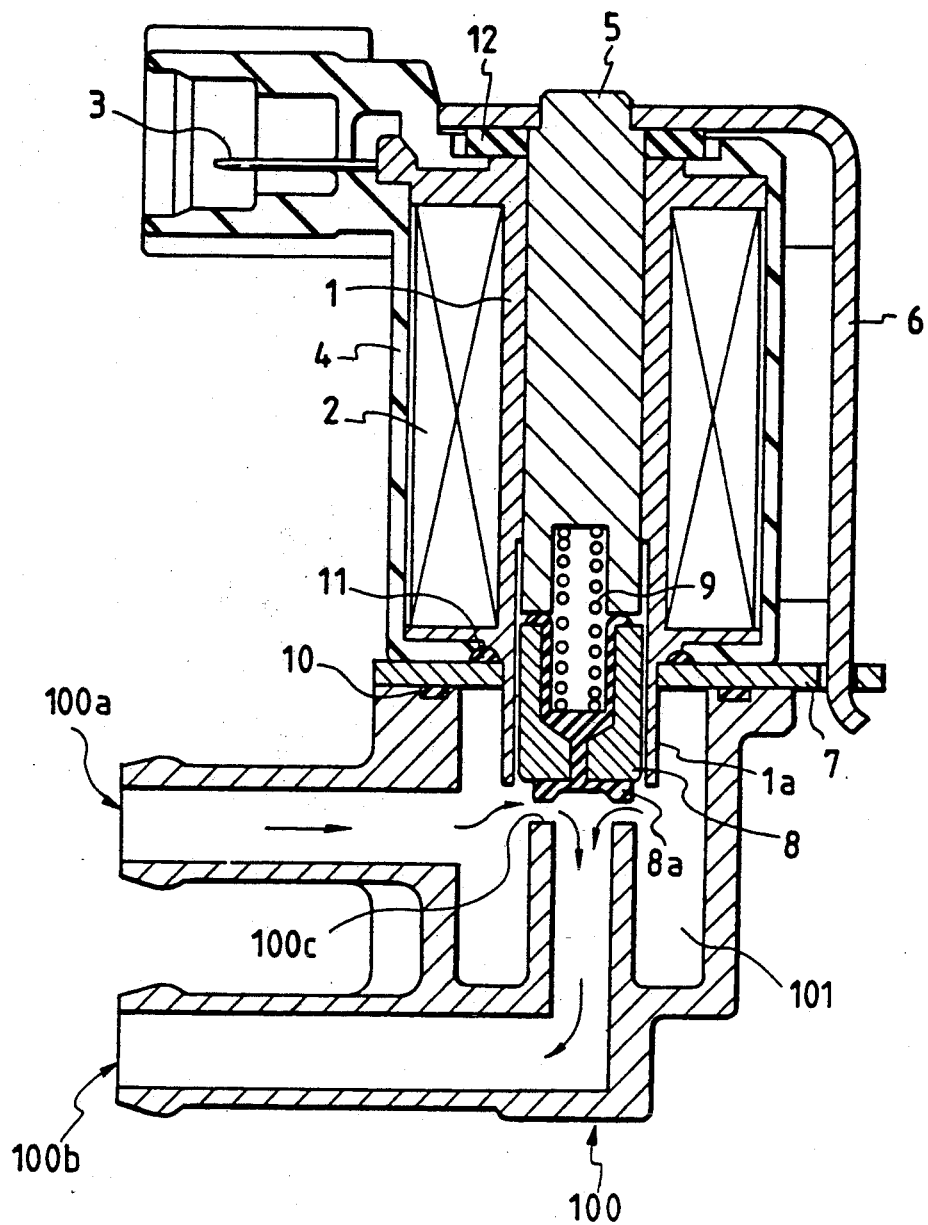
FIG. 1 is a sectional view showing a conventional solenoid valve.
Figure 2:
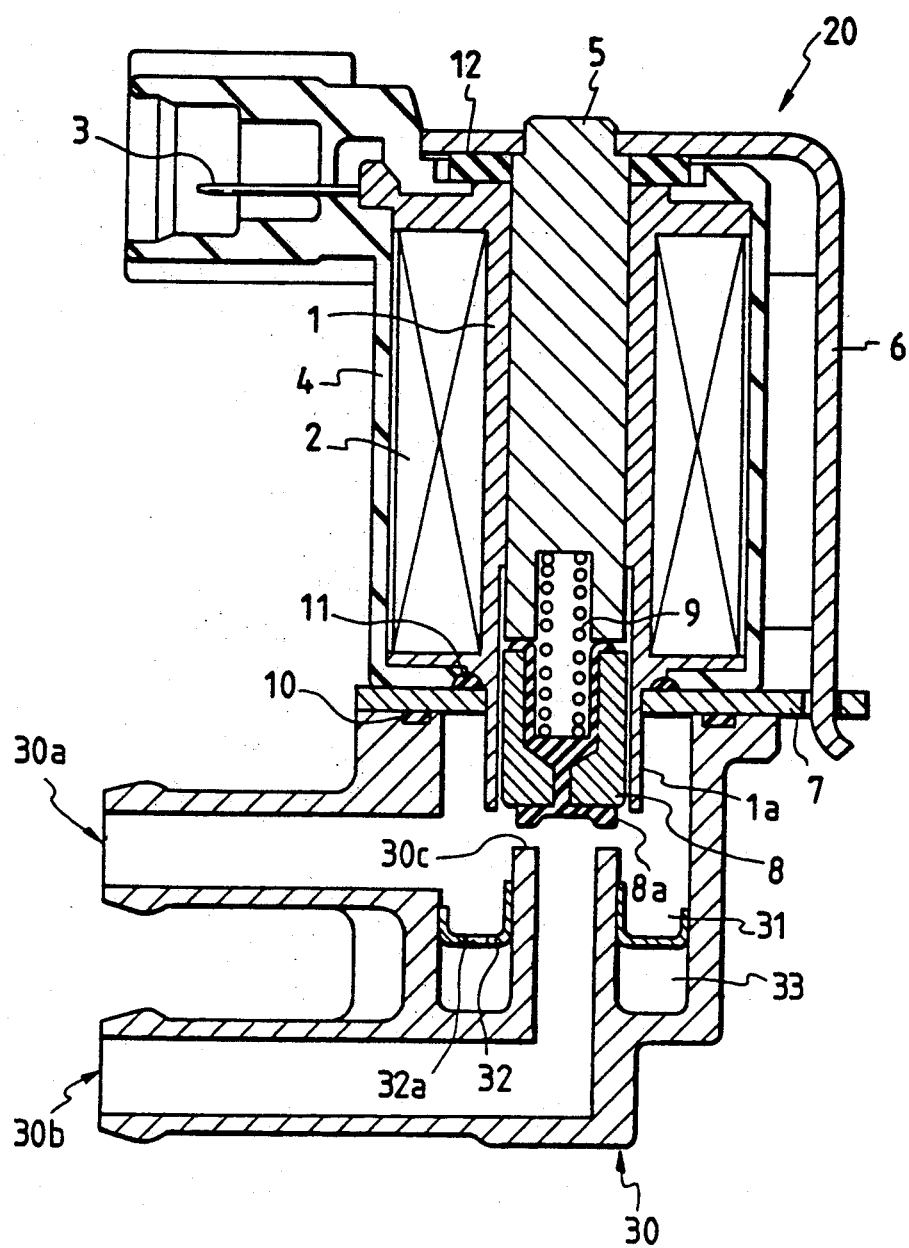
FIG. 2 is a sectional view showing a solenoid valve according to the first embodiment of the invention.

FIG. 2 is a sectional view showing a solenoid valve 20 according to the first embodiment of the invention. In the drawings, like parts and components are designated by the same reference numerals as that shown in FIG. 1, and the description of those parts and components will be omitted. Specifically, the parts or components designated by reference numerals 1 to 12 in FIG. 2 are the same as those shown in FIG. 1, and the primary feature of the first embodiment of the invention is a casing 30 disposed close to the plate 7 to surround an end of the plunger 8.

Solenoid valve 20 of the first embodiment includes an inlet port 30a, outlet port 30b, fluid chamber 31 and valve set 30c in such a manner that a valve member 8a formed of an elastic material and disposed on the end of the plunger faces the valve seat 30c as similar to the conventional valve shown in FIG. 1. A division wall 32 is provided in the fluid chamber 31 disposed inside the casing 30 for defining a resonant chamber 33 at a lower part of the fluid chamber 31. The division wall 32 is provided with one communication hole 32a which communicates between the resonant chamber 33 and the fluid chamber 31.

The operation of the solenoid valve 20 according to the first embodiment of the invention shown in FIG. 2 will be described hereinbelow.

The operation of the solenoid valve itself will not be described because it is substantially the same as that of the conventional solenoid valve described above. When an electric signal inputs to a terminal 3 from the outside device not shown, the plunger 8 slides up thereby moving the valve member 8a away from the valve seat 30c to open the valve. On the other hand, when the electric signal is stopped actuating the coil 2 the plunger 8 is restored to the original position while sliding by an elastic force of the spring 9, so that the valve member 8a comes into abutment against the valve seat 30c, and the valve closes.

In case that the open/close operations are repeated within a very short period, the air current noise with high frequency is generated because of the shutting of the control fluid by the valve member 8a. The sound pressure of the noise generated in the fluid chamber 31 enters into the resonant chamber 33 through the communication hole 32a and resonances therein. As a result, a large air vibration occurs at the communication hole 32a and, therefore, the energy of the airflow noise in the fluid chamber 31 is suppressed thereby eliminating the noise.

The suppression of the undesirable air current noise can be achieved by appropriately determining the capacity (V) of the resonant chamber, thickness (T) of the division wall, radius (R) of the communication hole and the number (N) of the communication holes to coincides with the frequency component of the noise to actually be suppressed so that the large air vibration generating around the communication hole due to the resonance of the air inside the resonant chamber is converted into the thermal energy owing to the viscous drag. The relationship between the above values can be represented by the following equations (1) and (2), given the resonance frequency f:

$$f = \frac{C}{2\pi} \sqrt{\frac{S}{(T + 1.57R) V}} \quad (1)$$

$$S = \frac{\pi}{4} \cdot N \cdot (2R)^2 \quad (2)$$

Figure 3:
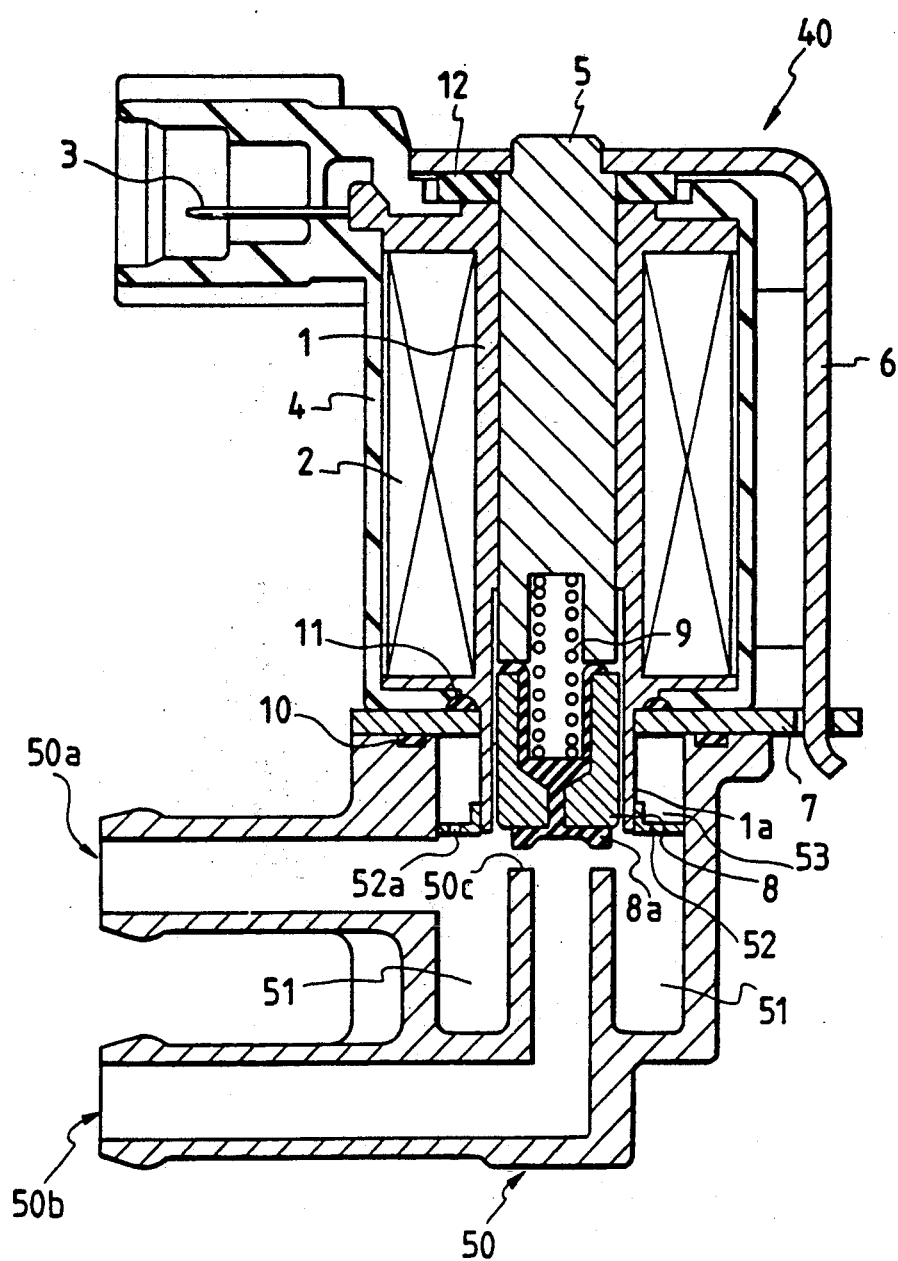
FIG. 3 is a sectional view showing a solenoid valve according to a second embodiment of the invention.

FIG. 3 is a sectional view showing a solenoid valve 40 according to a second embodiment of the invention.

The solenoid valve 40 shown in FIG. 3 has similar constructions to the first embodiment shown in FIG. 1 in that a casing 50 is provided with an inlet port 50a, outlet port 50b and valve seat 50c for controlled fluid and a resonant chamber 53 is defined in a fluid chamber 51 by a division wall 52. The solenoid valve 40 of the second embodiment is characterized in that the resonant chamber 53 is disposed above the fluid chamber 51, that is, around the outer peripheral portion of the slide guide part 1a of the plunger 8. The division wall 52 is provided with a communication hole 52a. The solenoid valve 40 of the second embodiment can obtain the same noise suppression capability as the first embodiment.

Figure 4:
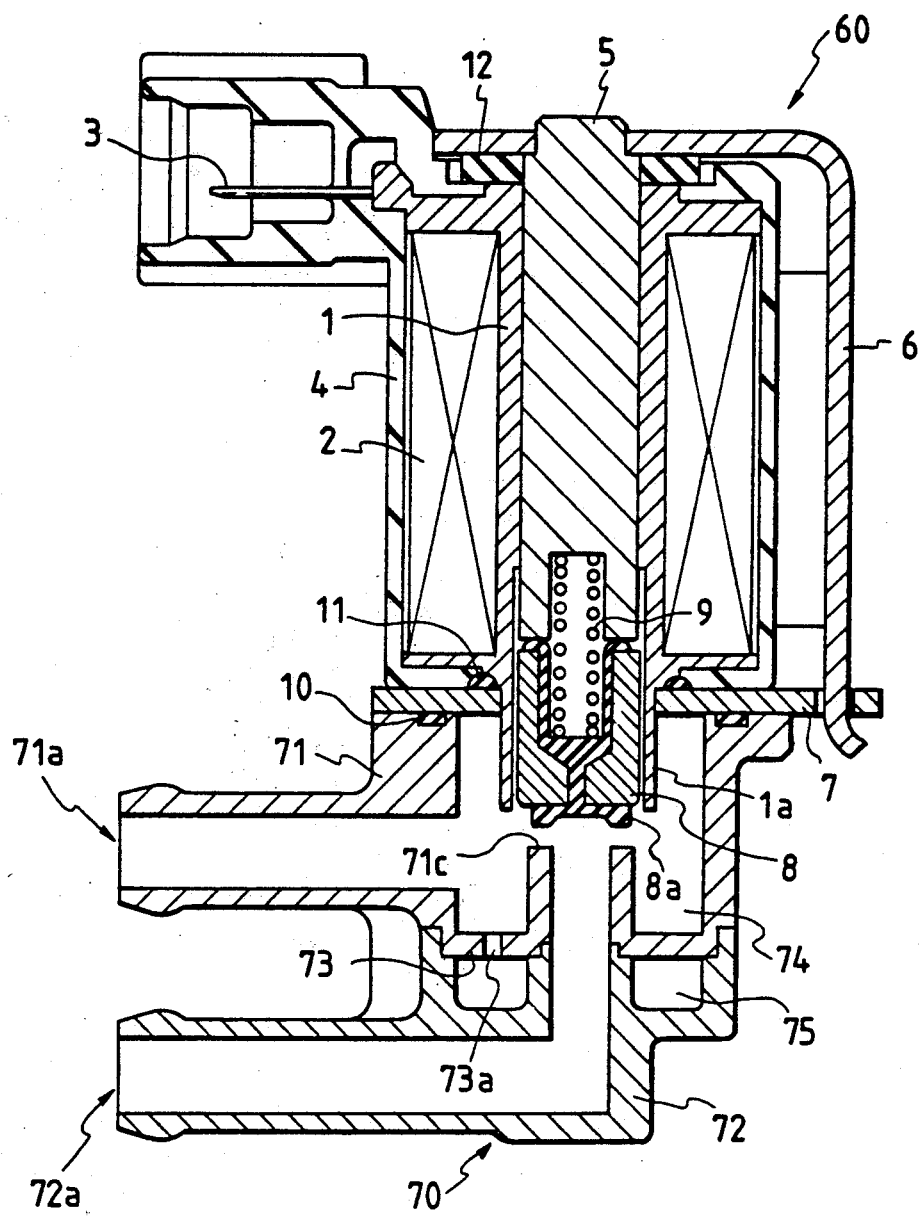
FIG. 4 is a sectional view showing a solenoid valve according to a third embodiment of the invention.

FIG. 4 is a sectional view showing a solenoid valve 60 according to a third embodiment of the invention.

According to the solenoid valve 60 of the third embodiment, a casing 70 for forming the flow path of the controlled fluid is divided into first casing 71 and second casing 72, and a division wall 73 is provided at an fittably engaging portion of the casings 71 and 72 as a part of the first casing 71. At least one communication hole 73a is provided on the division wall 73, which communicates between the fluid chamber 74 defined by the first casing 71 and the resonant chamber 75 defined by the second casing 72 having the outlet port 72a.

In the solenoid valve 60 of the third embodiment shown in FIG. 4, the division wall 73 is unitary formed with the first casing 71. However, the invention is not limited thereto or thereby. That is, the division wall may be unitary formed with the second casing 72. Further, a separate division to be fitted between the first and second casings wall may be employed.

Figure 5:
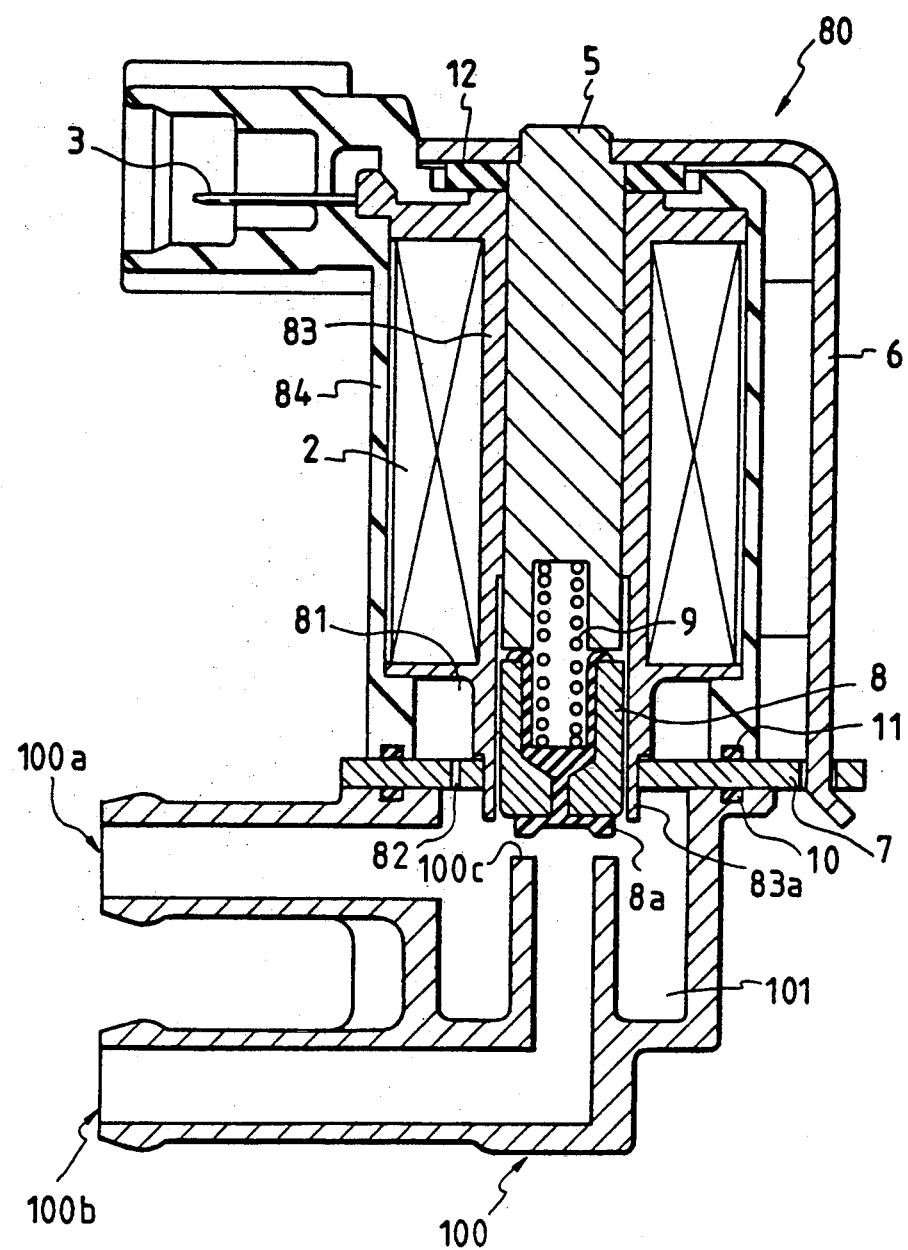
FIG. 5 is a sectional view showing a solenoid valve according to a fourth embodiment of the invention.

FIG. 5 is a sectional view showing a solenoid valve 80 according to a fourth embodiment of the invention. Merely the different portions from the first embodiment will be described. In the solenoid valve 80 of the fourth embodiment, a fluid chamber 101 communicates with a resonant chamber 81 through a communication hole 82 disposed on the plate 7.

That is, according to the fourth embodiment, the plate 7 constituting the magnetic path performs also as a division wall on which the communication hole 82 is provided differing from the first to third embodiments in which the resonant chamber is defined in the casing. In the forth embodiment, more specifically, an outer periphery of the plunger sliding guide part 83a of the bobbin 83 supporting the magnetic coil 2 and a part attaching the plate 7 of the outer cover 84 are extended so that the chamber surrounded by the plate 7, bobbin 83 and the outer cover 84 is employed as a resonant chamber 81. Thus, the resonant chamber is eliminated from the casing constituting the fluid passage. Since the other components are the same as those of the conventional solenoid valve shown in FIG. 1, the description is omitted. The operation of the solenoid valve 80 according to the forth embodiment and the function of the communication hole 82 and the resonant chamber are the same as that of the first embodiment.

As described above, according to the present invention, the air flow noise generated by open/close operation of the valve can effectively be suppressed within the valve. Therefore, an extra apparatus such as a silencer is not required to be mounted which is advantageous in that the apparatus can be simple in structure. Particularly, recently the engine room of an automobile is required to be compact and the solenoid valve according to the present invention is very much effective for such a small room. Further, the resonant chamber can easily be added to the conventional solenoid valve, or the plate can be employed as a division wall for defining the resonant chamber which would not increase the number of component parts. Accordingly, the solenoid valve of the invention is practically useful in several ways.

The invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

What is claimed is:

1. A solenoid valve comprising:
   an electro-magnetic coil having a bobbin and an electric wire wound on said bobbin;
   an outer cover for covering said electro-magnetic coil;
   magnetic path forming means for focusing magnetic field generated by actuating said electro-magnetic coil;
   a plunger slidably moving by said magnetic coil;
   a casing having an air inlet port, outlet port and a valve seat;
   a fluid passage formed in said casing extending from said inlet port to said outlet port;
   a spring for urging said plunger toward the valve closing direction; and
   a division wall for defining a part of said fluid passage as a resonant chamber, said division wall comprising at least one communication hole for communicating between said resonant chamber and said fluid passage, said division wall being fixed and nonmovable relative to the casing.

2. The solenoid valve of claim 1, wherein said fluid passage comprises a fluid chamber and said resonant chamber is provided below said fluid chamber.

3. The solenoid valve of claim 1, wherein said resonant chamber is provided around an outer periphery of said plunger and above said fluid passage.

4. The solenoid valve of claim 1, wherein said casing comprises a first casing and a second casing, said resonant chamber being defined between said first and second casings, and a part of one of said first and second casing performing as said division wall.

5. The solenoid valve of claim 1, wherein said magnetic path forming means comprises a plate performing also as said division wall, said resonant chamber being defined by said plate, said bobbin and said outer cover, and said communication hole being provided on said plate.

6. The solenoid valve of claim 1, wherein the resonant chamber has a predetermined volume, the predetermined volume of the resonant chamber being fixed.

7. The solenoid valve of claim 1, wherein the division wall engages the casing without any space being provided between the division wall and the casing.

8. The solenoid valve of claim 1, wherein the resonant chamber has a capacity (V), the division wall has a thickness (T) and the communication hole has a radius (R) and wherein a number (N) of communication holes are provided in the division wall, the resonant chamber suppressing a noise generated upon movement of the plunger when the noise has a resonance frequency (f) and when the following equations are satisfied:

$$f = \frac{C}{2\pi} \sqrt{\frac{S}{(T + 1.57R) V}} \text{ and}$$

$$S = \frac{\pi}{4} \cdot N \cdot (2R)^2.$$

9. The solenoid valve of claim 2, further comprising a valve seat positioned beneath and engagable with the plunger, the fluid passage being closed when the plunger is in engagement with the valve seat and the fluid passage passes through the valve seat, the division wall being mounted adjacent the valve seat, and the resonant chamber being provided below said division wall.

10. The solenoid valve of claim 3, further comprising a valve seat positioned beneath and engagable with the plunger, the fluid passage being closed when the plunger is in engagement with the valve seat, the division wall surrounding the outer periphery of the plunger and the division wall being a constant, fixed distance from the valve seat.

11. A solenoid valve comprising:
   an electro-magnetic coil having a bobbin and an electric wire wound on said bobbin;
   an outer cover for covering said electro-magnetic coil;
   magnetic path forming means for focusing magnetic field generated by actuating said electro-magnetic coil;
   a plunger slidably moving by said magnetic field;
   a casing having an air inlet port, outlet port and a valve seat;
   a fluid passage formed in said casing extending from said inlet port to said outlet port;
   a spring for urging said plunger toward the valve closing direction; and
   means for suppressing noise generated upon movement of the plunger, said means comprising a division wall with at least one communication opening defined therein, the division wall defining a part of said fluid passage as a resonant chamber, the at least one communication hole communicating between said resonant chamber and said fluid passage, the resonant chamber having a predetermined volume, the predetermined volume of the resonant chamber being fixed.

12. The solenoid valve of claim 10, wherein the division wall engages the casing without any space being provided between the division wall and the casing.

13. The solenoid valve of claim 10, wherein the division wall is fixed and nonmovable relative to the casing.

14. The solenoid valve of claim 10, wherein the resonant chamber has a capacity (V), the division wall has a thickness (T) and the communication hole has a radius (R) and wherein a number (N) of communication holes are provided in the division wall, the resonant chamber suppressing a noise generated upon movement of the plunger when the noise has a resonance frequency (f) and when the following equations are satisfied:

$$f = \frac{C}{2\pi} \sqrt{\frac{S}{(T + 1.57R) V}} \text{ and}$$

$$S = \frac{\pi}{4} \cdot N \cdot (2R)^2.$$

15. The solenoid valve of claim 10, further comprising a valve seat positioned beneath and engagable with the plunger, the fluid passage being closed when the plunger is in engagement with the valve seat and the fluid passage passes through the valve seat, the fluid passage comprises a fluid chamber and said resonant chamber being provided below said fluid chamber, the division wall being mounted adjacent the valve seat, and the resonant chamber being provided below said division wall.

16. The solenoid valve of claim 10, further comprising a valve seat positioned beneath and engagable with the plunger, the fluid passage being closed when the plunger is in engagement with the valve seat, the resonant chamber and the division wall being provided around an outer periphery of said plunger and above the fluid passage, the division wall being a constant, fixed distance from the valve seat.

17. The solenoid valve of claim 10, wherein said casing comprises a first casing and a second casing, said resonant chamber being defined between said first and second casings, and a part of one of said first and second casing performing as said division wall.

18. The solenoid valve of claim 10, wherein said magnetic path forming means comprises a plate performing also as said division wall, said resonant chamber being defined by said plate, said bobbin and said outer cover, and said communication hole being provided on said plate.

* * * * *